(12) United States Patent
Kim et al.

(10) Patent No.: US 11,834,117 B2
(45) Date of Patent: Dec. 5, 2023

(54) SYSTEM FOR MOUNTING A DOOR HINGE OF A VEHICLE

(71) Applicants: HYUNDAI MOTOR COMPANY, Seoul (KR); KIA MOTORS CORPORATION, Seoul (KR)

(72) Inventors: Keonyong Kim, Busan (KR); Byeong Ho Choi, Ulsan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 643 days.

(21) Appl. No.: 17/013,282

(22) Filed: Sep. 4, 2020

(65) Prior Publication Data
US 2021/0171139 A1 Jun. 10, 2021

(30) Foreign Application Priority Data
Dec. 9, 2019 (KR) .................. 10-2019-0162857

(51) Int. Cl.
| | |
|---|---|
| *B62D 65/06* | (2006.01) |
| *B62D 65/02* | (2006.01) |
| *B60J 5/04* | (2006.01) |
| *E05D 3/02* | (2006.01) |
| *B23P 19/10* | (2006.01) |

(52) U.S. Cl.
CPC ............ *B62D 65/06* (2013.01); *B60J 5/0468* (2013.01); *B62D 65/026* (2013.01); *B23P 19/10* (2013.01); *B23P 2700/50* (2013.01); *E05D 3/02* (2013.01); *E05Y 2600/56* (2013.01); *E05Y 2900/531* (2013.01)

(58) Field of Classification Search
CPC ...... B62D 65/026; B62D 65/06; B62D 25/04; B62D 65/18; B23K 2101/006;
(Continued)

(56) References Cited

U.S. PATENT DOCUMENTS 5,374,006 A * 12/1994 Mheidle ................. D06B 23/10
242/538
2007/0079503 A1 * 4/2007 Lee ......................... B62D 65/06
29/771
(Continued)

FOREIGN PATENT DOCUMENTS

KR 100873863 B1 * 12/2008
KR 100873863 B1 * 12/2008

*Primary Examiner* — Mahdi H Nejad
(74) *Attorney, Agent, or Firm* — LEMPIA SUMMERFIELD KATZ LLC

(57) ABSTRACT

A system for mounting a door hinge to upper and lower mounting portions of front and rear pillars of a vehicle body being transferred along a vehicle transfer line. The system includes: a jig frame installed to reciprocate in a vehicle width direction through a driving unit on a base frame outside the vehicle transfer line; a rotation index installed on the jig frame and rotatable by a predetermined angle through a servomotor; a vertical rotation shaft formed as a polyhedron having a cavity and coaxially connected to a rotation center axis of the rotation index along an up and down vertical direction; and a pair of clamping units installed through a mounting plate to a base plate fixed to each side of the vertical rotation shaft, the pair of clamping units being disposed at upper and lower portions of the mounting plate and configured to clamp the door hinge.

19 Claims, 13 Drawing Sheets

(58) Field of Classification Search
CPC .. B23K 37/0443; B23P 2700/50; B23P 19/00; B23P 19/001; B23P 19/006; B21D 39/021; B60J 5/0468; E05D 3/02; E05D 5/062; E05D 11/0009; E05Y 2600/56; E05Y 2900/531
See application file for complete search history.

(56) References Cited

U.S. PATENT DOCUMENTS

| | | | |
|---|---|---|---|
| 2009/0140551 A1* | 6/2009 | Stalhammar | B62D 25/04 296/193.06 |
| 2009/0265888 A1* | 10/2009 | Lee | B62D 65/06 16/252 |
| 2013/0091687 A1* | 4/2013 | Lee | E05D 11/0009 29/281.5 |
| 2014/0167342 A1* | 6/2014 | Jin | B23P 19/10 269/27 |
| 2014/0259938 A1* | 9/2014 | Choi | E05D 15/34 49/226 |
| 2014/0359994 A1* | 12/2014 | Park | B62D 65/005 29/407.05 |
| 2015/0013132 A1* | 1/2015 | Wang | B62D 65/00 29/281.5 |
| 2015/0013133 A1* | 1/2015 | Lee | B62D 65/06 29/281.6 |
| 2015/0082608 A1* | 3/2015 | Lee | B62D 65/06 29/700 |
| 2015/0183474 A1* | 7/2015 | Jin | B62D 65/06 414/800 |

* cited by examiner

SYSTEM FOR MOUNTING A DOOR HINGE OF A VEHICLE

CROSS-REFERENCE TO RELATED APPLICATION

This application claims priority to and the benefit of Korean Patent Application No. 10-2019-0162857 filed in the Korean Intellectual Property Office on Dec. 9, 2019, the entire contents of which are incorporated herein by reference.

BACKGROUND OF THE DISCLOSURE

(a) Field of the Disclosure

The present disclosure relates to a system for automatically mounting a door hinge of a vehicle.

(b) Description of the Related Art

In general, the process for mounting a door to a vehicle body includes mounting a door hinge to the front and rear pillars of the vehicle body, and then fastening the door to the door hinge.

In order to mount the door hinge, when the vehicle body enters a working position through a conveyor system, door hinges are tightly contacted to upper and lower door hinge mounting portions of front and rear pillars by using door hinge mounting jigs. The door hinges are bolt engaged to the door hinge mounting portions.

The door hinge mounting jig clamps the door hinge and moves forward to the pillar of the vehicle body. The door hinge mounting jig then inserts a tooling pin into the vehicle body and clamps the vehicle body. The door hinge mounting jig may correctly position the door hinge to the upper and lower door hinge mounting portions of the front and rear pillars.

Conventionally, to actively cope with mixed production of multiple types of vehicles, each door hinge mounting jig clamps a door hinge that is different according to vehicle types. Therefore, it may be required to develop different door hinge mounting jigs respectively to install door hinges to door hinge mounting portions of different vehicle types.

According to such conventional art, a hinge clamping unit may be required to include a plurality of cylinder devices to simultaneously clamp door hinges and to align the door hinges to predetermined positions. Therefore, weight and volume of a hinge clamping unit may increase, thereby increasing weight and volume of the entire jig equipment.

Therefore, according to conventional art, due to an increase of weight and volume of the entire jig equipment, it may be difficult to simultaneously mount door hinges at upper and lower door hinge mounting portions of the front and rear pillars. Alternatively, mounting door hinges to the front and rear pillars by separate processes may increase process costs and costs for the jig equipment.

The above information disclosed in this Background section is only to enhance understanding of the background of the disclosure. Therefore, the Background may contain information that is not prior art that is already known in this country to a person of ordinary skill in the art.

SUMMARY OF THE DISCLOSURE

The present disclosure has been made in an effort to provide a system for mounting a door hinge of a vehicle having advantages including the capability of coping with flexible manufacturing of multiple types of vehicles and enabling reduction of weight and volume.

In one embodiment, the system is for mounting a door hinge to upper and lower mounting portions of front and rear pillars of a vehicle body being transferred along a vehicle transfer line. The system includes: a jig frame installed to reciprocate in a vehicle width direction through a driving unit on a base frame outside the vehicle transfer line; a rotation index installed on the jig frame and rotatable by a predetermined angle through a servomotor; a vertical rotation shaft formed as a polyhedron having a cavity and coaxially connected to a rotation center axis of the rotation index along an up and down vertical direction; and a pair of clamping units installed through a mounting plate to a base plate fixed to each side of the vertical rotation shaft, disposed at upper and lower portions of the mounting plate, and configured to clamp the door hinge.

The rotation index may be coupled to a hollow driveshaft connected to the servomotor on the jig frame.

Cavity centers of the driveshaft and the vertical rotation shaft may be coaxially connected to each other along an up and down direction.

Each of the clamping units may include a first driving cylinder fixedly installed to the mounting plate and a movable block having a pair of tooling pins fitted into a tooling hole provided at the door hinge, the moveable block being connected to an operation rod of the first driving cylinder through a movable bracket. Each of the clamping units may also include a fixed block having a clamp hole fitted with the tooling pin penetrating the tooling hole of the door hinge and being fixedly installed to the mounting plate.

The movable block may move backward by the backward operation of the first driving cylinder and clamp the door hinge through the fixed block.

The clamping unit may include a second driving cylinder fixedly installed to the mounting plate through a fixing bracket and a stopping block connected to an operation rod of the second driving cylinder. The clamping unit may be configured to support the door hinge clamped between the movable block and the fixed block.

The system for mounting a door hinge of a vehicle according to an embodiment may further include: a floating body slidably coupled to the base plate in an up and down direction; a first floating member connected to the mounting plate, coupled to the floating body slidably along the vehicle length direction of the vehicle body, and configured to support a forward and backward movement of the mounting plate; and a second floating member installed to the base plate correspondingly to a bottom end of the floating body, and configured to support an up and down movement of the floating body.

The first floating member may include at least one rail block fixedly coupled to the mounting plate and slidably coupled along the vehicle length direction of the vehicle body to a guide rail provided on the floating body.

The second floating member may include a mounting block fixedly installed on the base plate along the vehicle length direction of the vehicle body, and a plurality of cushion cylinders installed to the mounting block with a predetermined spacing. The plurality of cushion cylinders may be configured to support the bottom end of the floating body.

In another embodiment, the system is for mounting a door hinge to upper and lower mounting portions of front and rear pillars of a vehicle body transferred along a vehicle transfer line. The system includes: a jig frame installed to reciprocate in a vehicle width direction through a driving unit on a base frame outside the vehicle transfer line; a rotation index rotatably installed on the jig frame by a predetermined angle through a servomotor, and coupled to a hollow driveshaft connected to the servomotor; a vertical rotation shaft formed as a polyhedron having a cavity and coaxially connected to the rotation index along an up and down vertical direction; a bezel fixing unit fixedly installed to the jig frame by penetrating the cavity of the driveshaft and the cavity of the vertical rotation shaft, and configured to interiorly hold an electric cable and an air-supply tube; and a pair of clamping units installed through a mounting plate to a base plate fixed to each side of the vertical rotation shaft, disposed at upper and lower portions of the mounting plate, and configured to clamp the door hinge.

The bezel fixing unit may include: a post member formed in a cylindrical shape and fixed to the jig frame through cavities of the driveshaft and the vertical rotation shaft; a bezel guide member having a plurality of penetration holes fitted with the electric cable and the air-supply tube through an interior of the post member, and being connected to the post member; and a union joint connecting the post member and the bezel guide member.

The penetration holes may include a first penetration hole penetrating the bezel guide member in an up and down direction and fitted with the electric cable, and a second penetration hole being separate from the first penetration hole, formed along the up and down direction of the bezel guide, penetrating exterior circumference surfaces of the bezel guide member, and fitted with the air-supply tube.

The bezel fixing unit further may include a base member formed in a cylindrical shape having an opening portion, disposed at a bottom end of the post member, and fixed to the jig frame.

The vertical rotation shaft may be formed as a polyhedron having four surfaces.

In another embodiment, the system is for mounting a door hinge to upper and lower mounting portions of front and rear pillars of a vehicle body being transferred along a vehicle transfer line. The system includes: a jig frame installed to reciprocate in a vehicle width direction through a driving unit on a base frame outside the vehicle transfer line; a rotation index rotatably installed on the jig frame by a predetermined angle through a servomotor, and coupled to a hollow driveshaft connected to the servomotor; a vertical rotation shaft formed as a polyhedron having a cavity and coaxially connected to the rotation index along an up and down vertical direction; a bezel fixing unit fixedly installed to the jig frame by penetrating the cavity of the driveshaft and the cavity of the vertical rotation shaft, and configured to interiorly hold an electric cable and an air-supply tube; a pair of clamping units installed through a mounting plate to a base plate fixed to each side of the vertical rotation shaft, disposed at upper and lower portions of the mounting plate, and configured to clamp the door hinge; at least one centering block fixedly installed to the mounting plate, inserted into a center hole provided at the vehicle body, and holding a reference point of the mounting plate with respect to the vehicle body; at least one supporting block fixedly installed to the mounting plate, and configured to support an outer panel of the vehicle body; and a vehicle body clamper rotatably installed to the mounting plate to clamp the vehicle body.

The jig frame may be slidably coupled to a guide rail installed on the base frame in the vehicle width direction.

The driving unit may be installed to the base frame and comprise a main driving cylinder connected to the jig frame.

The centering block may be formed in a shape of which a cross-section gradually increases as the centering block moves away from the vehicle body.

The supporting block may be formed in a shape of a rectangular block of rubber material.

The vehicle body clamper may include a rotation cylinder fixedly installed to the mounting plate, and a clamping block connected to a rotation rod of the rotation cylinder. The clamping block may be configured to clamp an interior side of the vehicle body.

A system for mounting a door hinge of a vehicle according to embodiments disclosed herein may be used to actively cope with mixed production of multiple types of vehicles. The system may provide reduction of weight and volume of an entire apparatus, cost reduction due to process reduction, improvement of work efficiency and productivity, and more working degree of freedom.

Further, effects that can be obtained or expected from embodiments disclosed herein are directly or suggestively described in the following detailed description. In other words, various effects expected from embodiments disclosed herein are described in the following detailed description.

BRIEF DESCRIPTION OF THE DRAWINGS

The drawings are intended to be used as references for describing the embodiments, and the accompanying drawings should not be construed as limiting the technical spirit of the present disclosure.

DESCRIPTION OF SYMBOLS

Figure 1:
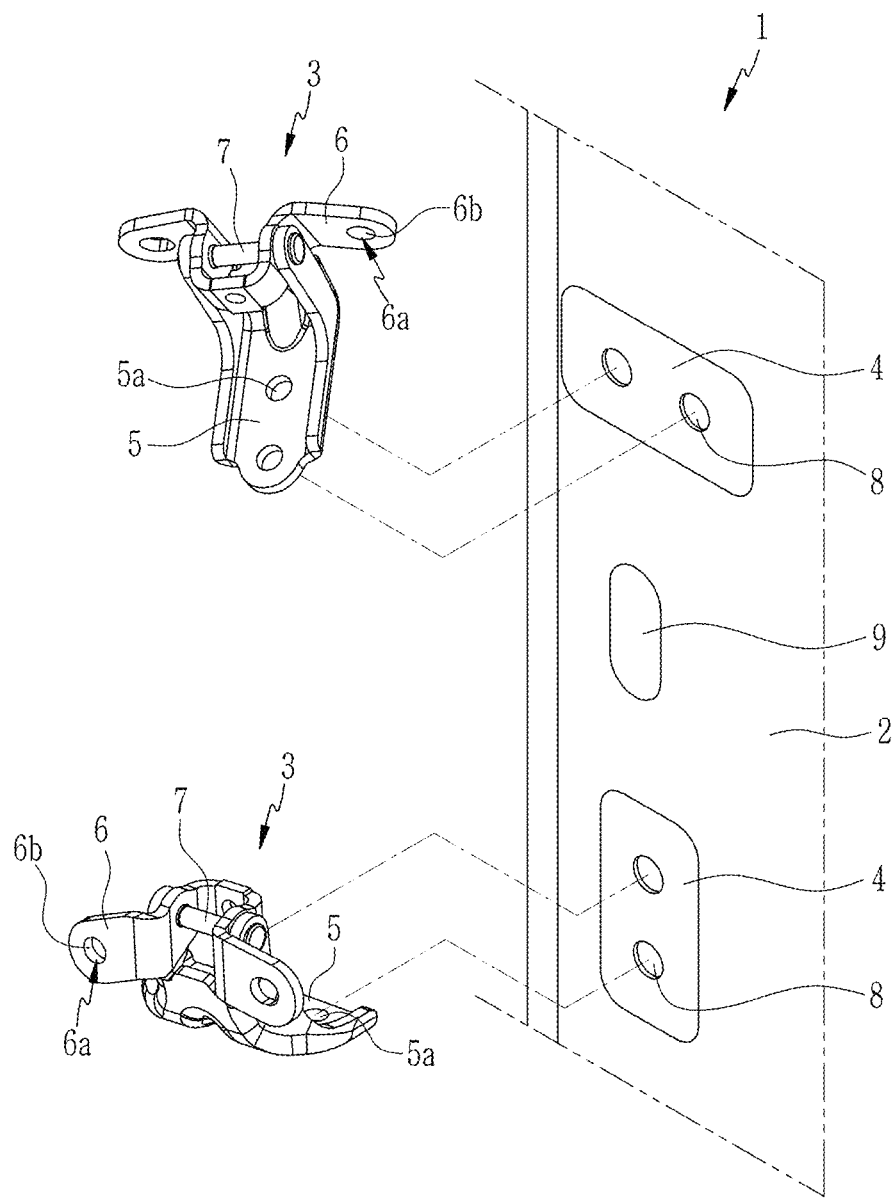
FIG. 1 schematically shows a door hinge mounting structure of a vehicle body according to an embodiment.

1: vehicle body
2: pillar
3: door hinge
4: door hinge mounting portion
5: hinge bracket
5a: first fastening hole
6: door bracket
6a: second fastening hole
6b: tooling hole
7: hinge pin
8: bolt hole
9: center hole
S: rotation center axis
10: base frame
30: jig frame
31: driving unit 33, 215, 313: guide rail
35: main driving cylinder
50: rotation index
51: servomotor
53: driveshaft
70: vertical rotation shaft
71: polyhedron
100: door hinge mounting apparatus
101: electric cable
103: air-supply tube
110: bezel fixing unit
111: post member
131: base member
133: opening portion
151: bezel guide member
153: first penetration hole
155: second penetration hole
171: union joint
173: connection hole
210: clamping unit
211: base plate
213: mounting plate
231: first driving cylinder
233, 265: operation rod
241: movable block
243: tooling pin
245: movable bracket
251: fixed block
253: clamp hole
261: second driving cylinder
263: fixing bracket
271: stopping block
311: floating body
331: first floating member
333: rail block
351: second floating member
353: mounting block
355: cushion cylinder
411: centering block
511: supporting block
611: vehicle body clamper
613: rotation cylinder
614: rotation rod
615: clamping block

DETAILED DESCRIPTION OF THE EMBODIMENTS

The present disclosure is described more fully hereinafter with reference to the accompanying drawings, in which embodiments of the disclosure are shown. As those having ordinary skill in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

The size and thickness of each element are arbitrarily shown in the drawings, but the present disclosure is not necessarily limited thereto, and in the drawings, the thickness of layers, films, panels, regions, and the like, are exaggerated for clarity.

In the following description, dividing names of components into first, second and the like is to divide the names because the names of the components are the same as each other and an order thereof is not particularly limited.

Throughout this specification and the claims which follow, unless explicitly described to the contrary, the word "comprise" and variations such as "comprises" or "comprising" are understood to imply the inclusion of stated elements but not the exclusion of any other elements.

Further, the terms " . . . unit", " . . . mechanism", " . . . portion", " . . . member", and the like used herein mean a unit of inclusive components performing at least one or more functions or operations.

FIG. 1 schematically shows a door hinge mounting structure of a vehicle body according to an embodiment.

Referring to FIG. 1, an embodiment of the present disclosure may be applied to a door mounting process of mounting a front door and a rear door on a vehicle body 1 in a vehicle assembly factory.

For example, an embodiment may be applied to a process of pre-mounting door hinges 3 on upper and lower sides of front and rear pillars 2 of both side assemblies in the vehicle body 1, respectively.

In this example, the front and rear pillars 2 of the vehicle body 1 form door hinge mounting portions 4 for mounting the upper and lower door hinges 3 on the upper and lower sides, respectively.

The door hinges 3 may be divided into an upper hinge mounted to an upper door hinge mounting portion 4 and a lower hinge mounted to a lower door hinge mounting portion 4, regarding the front and rear pillars 2.

The upper hinge of the door hinge 3 may be mounted on an upper part of the front and rear pillars 2, and an upper part of front and rear doors. The lower hinge of the door hinge 3 may be mounted on a lower part of the front and rear pillars 2, and a lower part of front and rear doors.

The door hinge 3 includes a hinge bracket 5 mounted on the upper and lower door hinge mounting portions 4, a door bracket 6 mounted on a door (not shown), and a hinge pin 7 that engages the hinge bracket 5 and the door bracket 6.

A first fastening hole 5a for fastening a bolt is formed in the hinge bracket 5, and a second fastening hole 6a for fastening a bolt is formed in the door bracket 6. The second fastening hole 6a may be provided as a tooling hole 6b for setting a reference position of the door hinge 3.

Furthermore, bolt holes 8 for bolting the hinge bracket 5 of the door hinge 3 are formed in the upper and lower door hinge mounting portions 4.

Furthermore, a center hole 9 is formed between the upper and lower door hinge mounting portions 4 in the pillar 2 to hold a reference point of the present apparatus with respect to the vehicle body 1.

Referring to a structure of vehicle body 1 and an arrangement of door hinge 3 described with reference to FIG. 1, a system for mounting a door hinge of a vehicle according to an embodiment is hereinafter described in detail.

Figure 2:
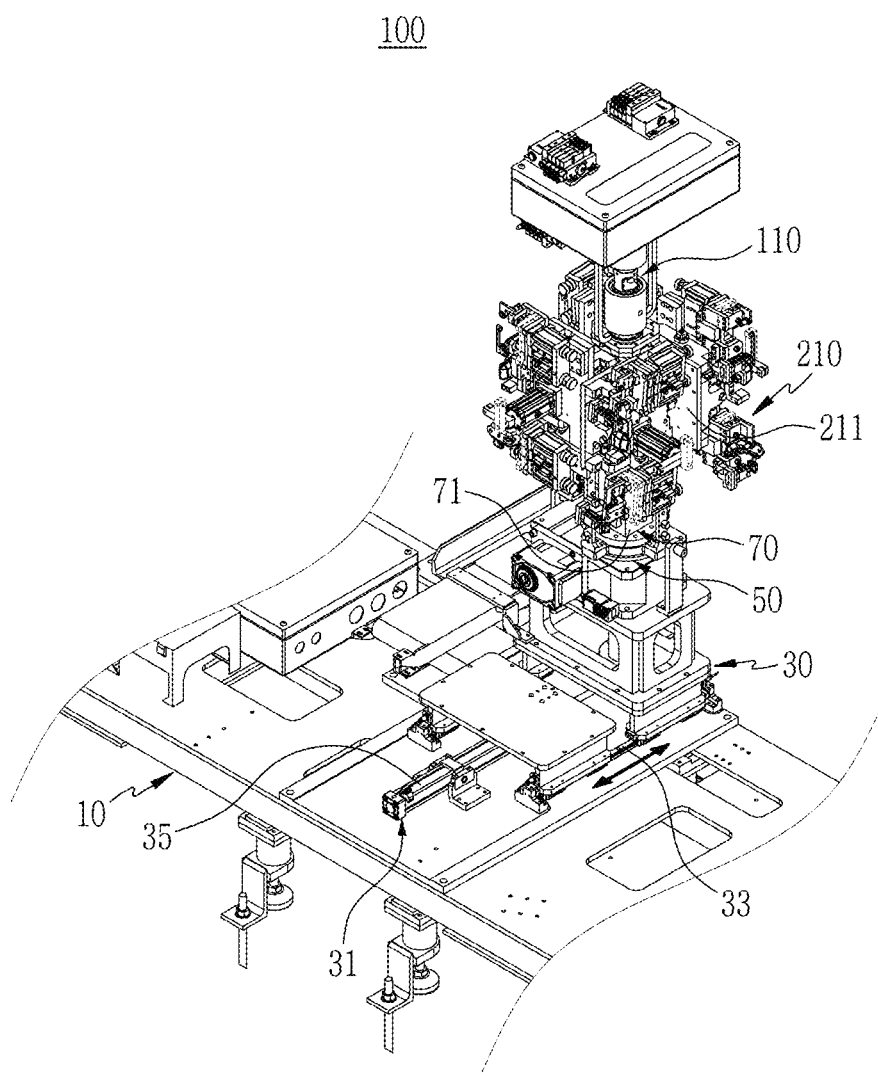
FIG. 2 is a perspective view of a system for mounting a door hinge of a vehicle according to an embodiment.

FIG. 2 is a perspective view of a system for mounting a door hinge of a vehicle according to an embodiment.

Referring to FIG. 2, a system for mounting a door hinge of a vehicle according to an embodiment 100 is for mounting a door hinge 3 to a vehicle body 1 that is transferred along a vehicle transfer line (not shown in the drawings) while being loaded on a carriage (or a pallet) (not shown in the drawings).

In other words, the door hinge mounting apparatus 100 may automatically mount the door hinges 3 to the upper and lower door hinge mounting portions 4 of the front and rear pillars 2, at both sides of the vehicle body 1 transferred to a predetermined position along the vehicle transfer line.

According to an embodiment, a transfer direction of a carriage (or a pallet) may be defined as a vehicle body transfer direction. The vehicle body transfer direction (vehicle length direction) is typically called a T direction, a vehicle width direction is called an L direction, and a vehicle height direction is called an H direction.

In the description of an embodiment, a vehicle length direction, a vehicle width direction, and a vehicle height direction may also be used as reference directions instead of the LTH directions.

In addition, hereinafter, an "end (one end or the other end)" may be defined as any one end or may be defined as a predetermined portion (one end portion or the other end portion) including the end.

An embodiment provides a system 100 for mounting a door hinge of a vehicle that may reduce weight and volume of an entire apparatus and may improve the worker's working degree of freedom.

Furthermore, a system for mounting a door hinge of a vehicle according to an embodiment 100 may be used to actively cope with mixed production of multiple types of vehicles, may absorb an assembly deviation of the vehicle body 1, and may precisely perform a jig adjustment according to the vehicle types or assembly deviation of the vehicle body 1.

For such a purpose, a system for mounting a door hinge of a vehicle according to an embodiment 100 includes a jig frame 30, a rotation index 50, a vertical rotation shaft 70, a bezel fixing unit 110, and a clamping unit 210.

Constituent elements described above and below may be formed on a base frame 10 disposed on both sides of the vehicle transfer line, both sides being outside the vehicle transfer line. The base frame 10 may be formed in a single frame or may be formed as a combination of component frames.

The base frame 10 is intended to support constituent elements, and includes accessory elements such as various brackets, blocks, plates, housings, covers, and collars.

The above accessory elements are for installing constituent elements to the base frame 10, and therefore, the aforementioned accessory elements are also collectively referred to as the base frame 10, except for exceptional cases.

In an embodiment, the jig frame 30 is installed to reciprocate in the vehicle width direction on the base frame 10 through the driving unit 31. The jig frame 30 is slidably coupled to a pair of guide rails 33 installed on the base frame 10 along the vehicle width direction.

The driving unit 31 includes a main driving cylinder 35, e.g., as a pneumatic cylinder. The main driving cylinder 35 is fixed to the base frame 10 and connected to the jig frame 30.

Alternatively, the driving unit 31 may include a servomotor. In addition, the driving unit 31 may include a handling robot that can be selectively combined with the jig frame 30.

Furthermore, the jig frame 30 is not necessarily limited to being installed on the base frame 10 to reciprocate in the vehicle width direction and may be mounted directly to an end of an arm of the handling robot.

Figure 3:
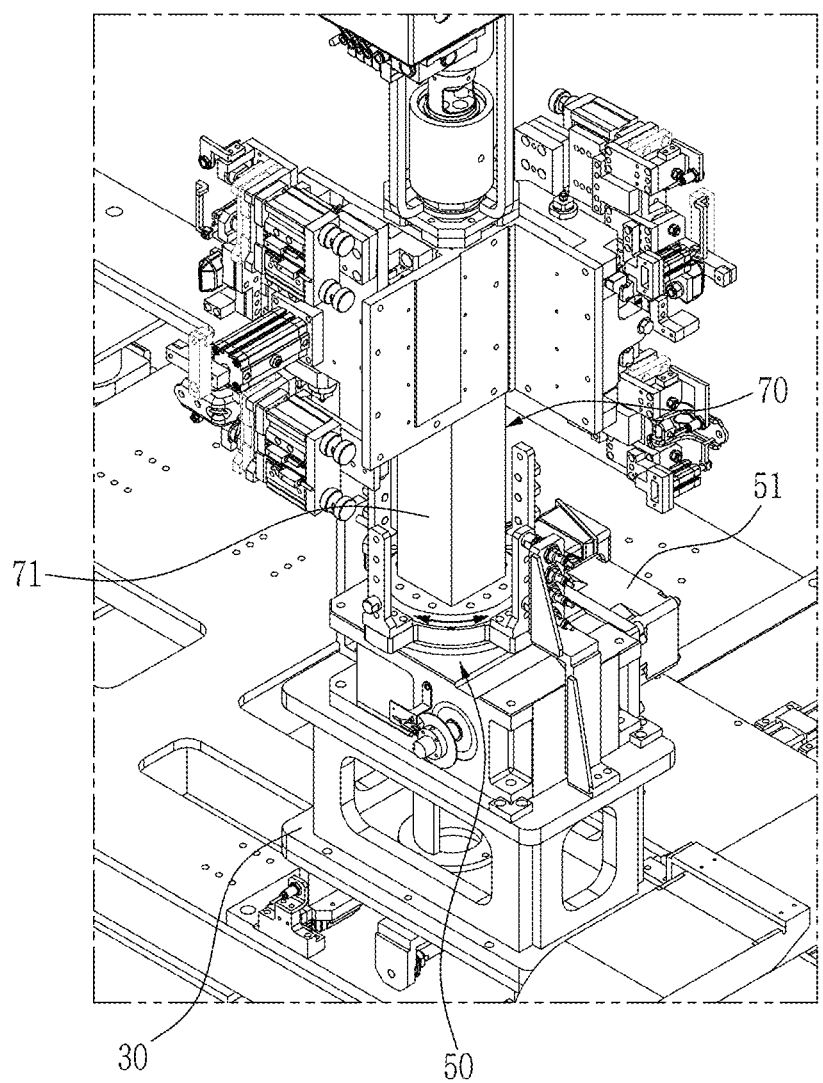
FIG. 3 and FIG. 4 illustrate a rotation index applied to a system for mounting a door hinge of a vehicle according to an embodiment.
Figure 4:
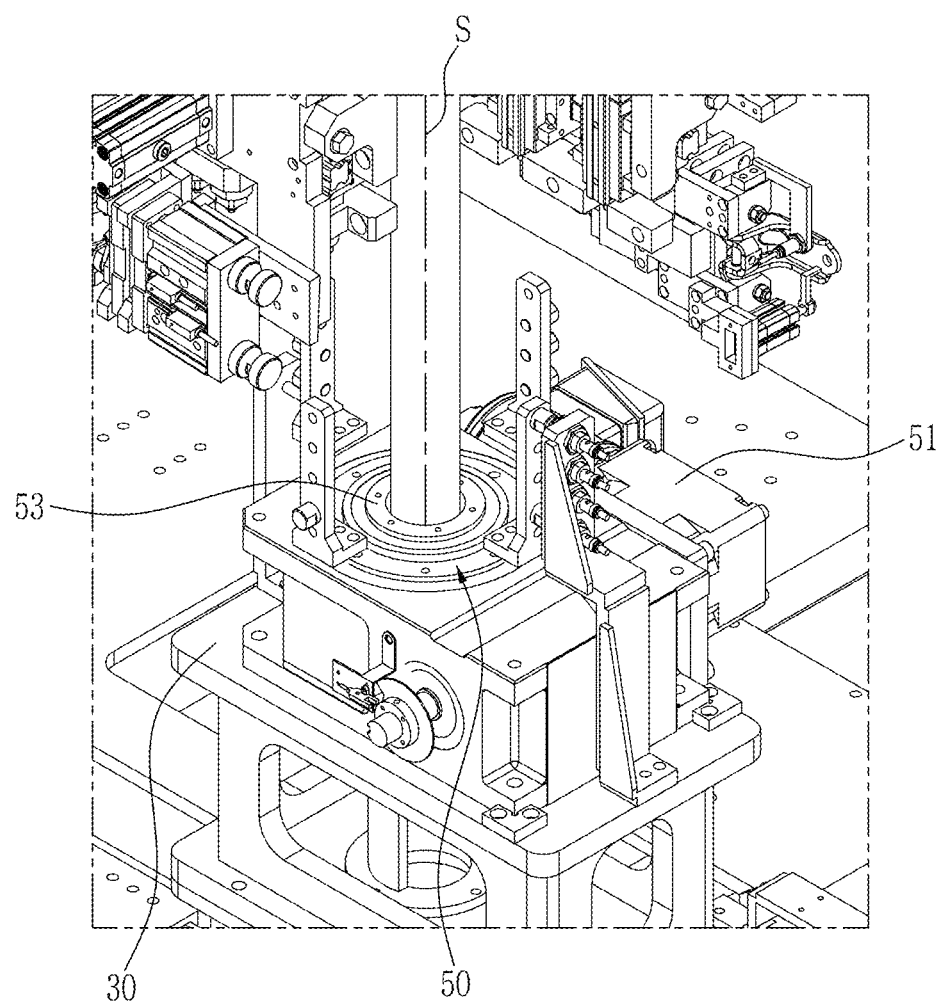

FIG. 3 and FIG. 4 illustrate a rotation index applied to a system for mounting a door hinge of a vehicle according to an embodiment.

Referring to FIG. 3 and FIG. 4, in an embodiment, the rotation index 50 is rotatably installed on the jig frame 30, by a predetermined rotation angle (e.g., 90 degrees) by a servomotor 51.

The servomotor 51 may be provided as a motor capable of servo-control in a rotation speed and a rotating direction and may be fixedly installed on the jig frame 30.

The rotation index 50 rotates around the rotation center axis S on the jig frame 30 and is coupled to a hollow driveshaft 53 connected to the servomotor. 51. The hollow driveshaft 53 forms a rotation center axis S (refer to FIG. 4) of the rotation index 50.

In an embodiment, as shown in FIG. 3 and FIG. 4, the vertical rotation shaft 70 is coaxially connected to the rotation index 50 through the rotation center axis S of the rotation index 50.

The vertical rotation shaft 70 includes a hollow polyhedron 71 and is coaxially connected to the rotation center axis S of rotation index 50 along the up and down vertical directions. In other words, hollow centers of the driveshaft 53 and the vertical rotation shaft 70 as described above are coaxially connected to each other along the up and down directions.

For example, the vertical rotation shaft 70 is provided as the polyhedron 71 having four surfaces. However, the vertical rotation shaft 70 is not limited thereto and may be provided as a polyhedron having more than four surfaces. A bottom end of the vertical rotation shaft 70 may be bolt-engaged with the rotation index 50.

Referring to FIG. 2, in an embodiment, the bezel fixing unit 110 is configured to interiorly fix an electric cable 101 (refer to FIG. 7) and an air-supply tube 103 (refer to FIG. 7) for distributing electric power and air required for operation of the entire apparatus.

Figure 5:
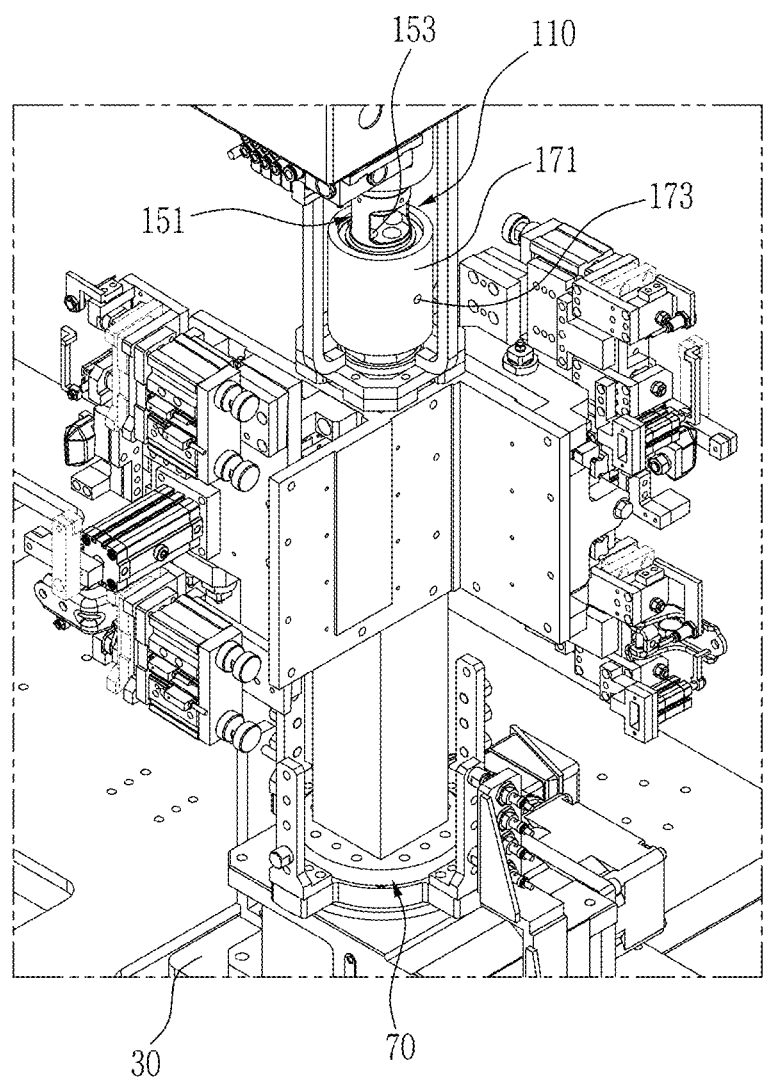
FIGS. 5-7 respectively illustrate a bezel fixing unit applied to a system for mounting a door hinge of a vehicle according to an embodiment.
Figure 6:
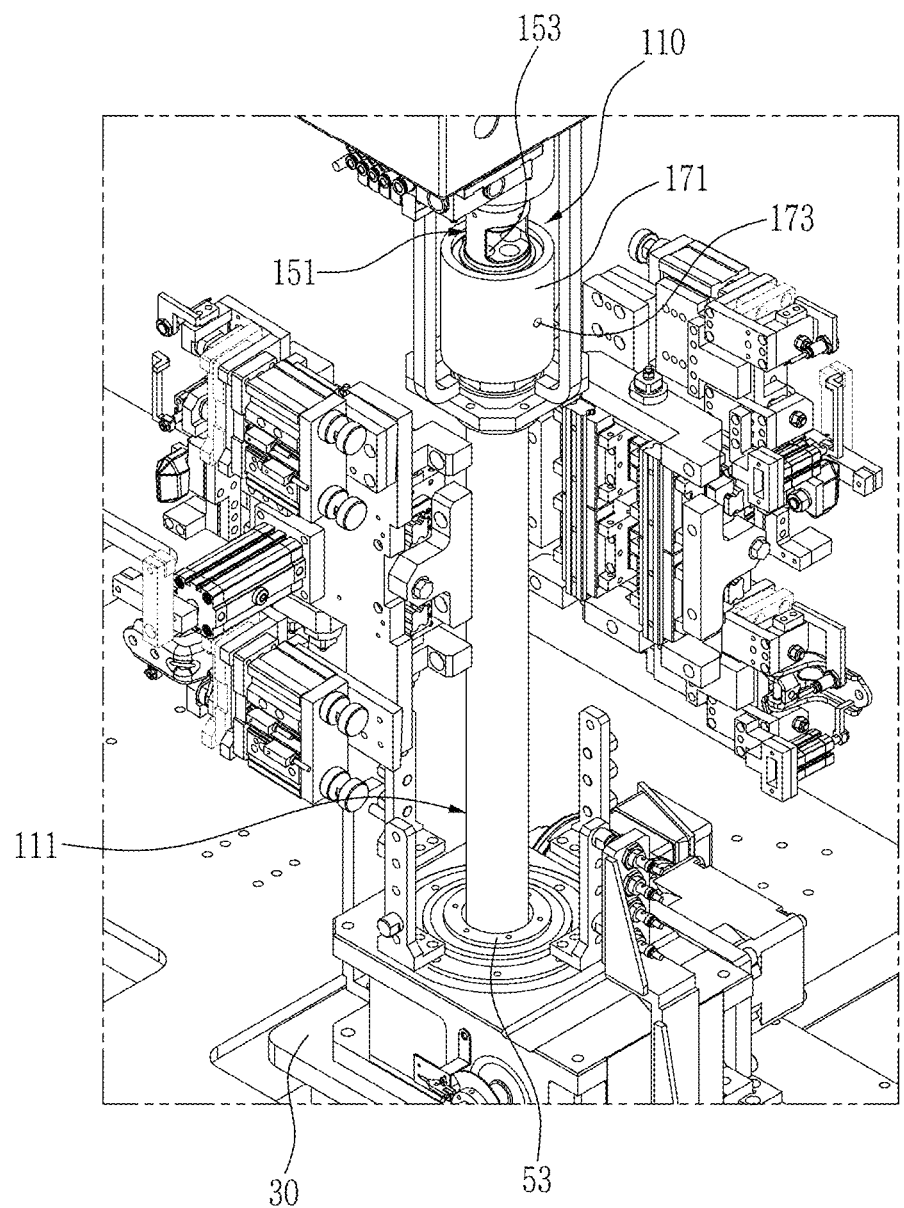
Figure 7:
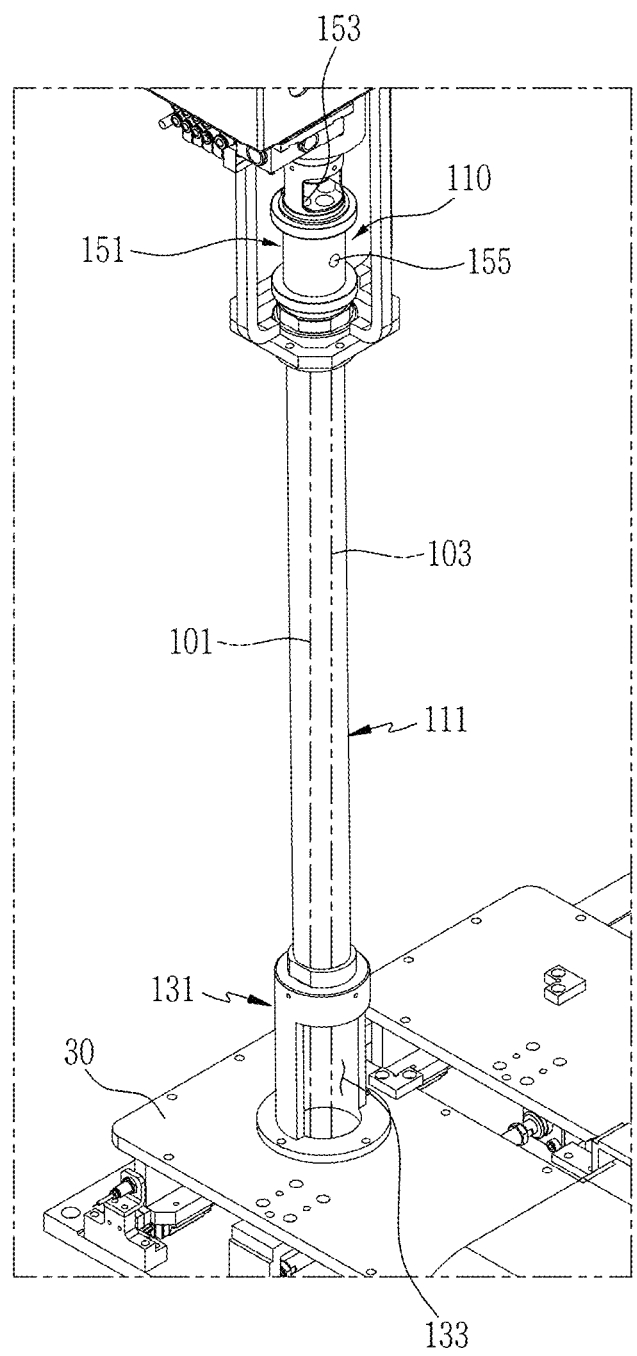
Figure 8:
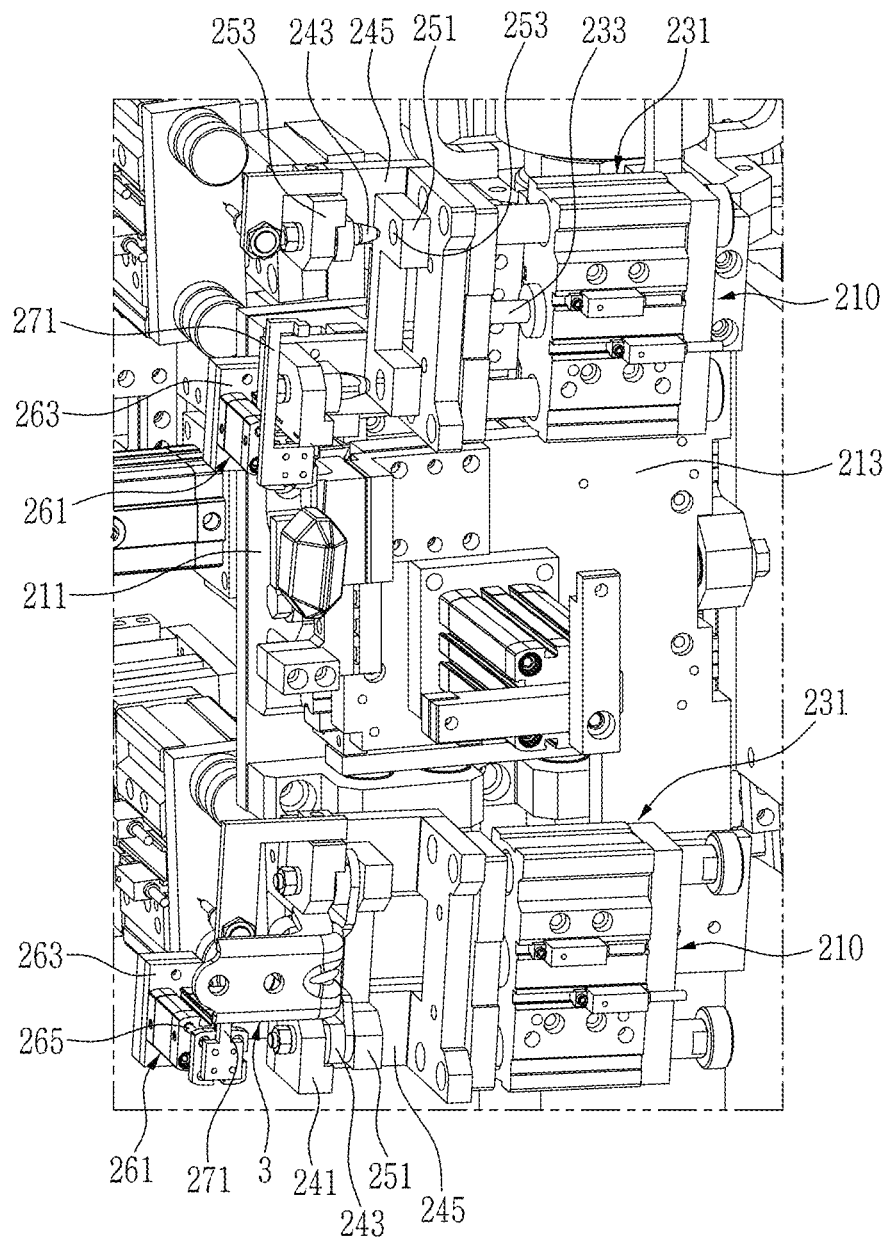
FIGS. 8-11 respectively illustrate a clamping unit applied to a system for mounting a door hinge of a vehicle according to an embodiment.
Figure 9:
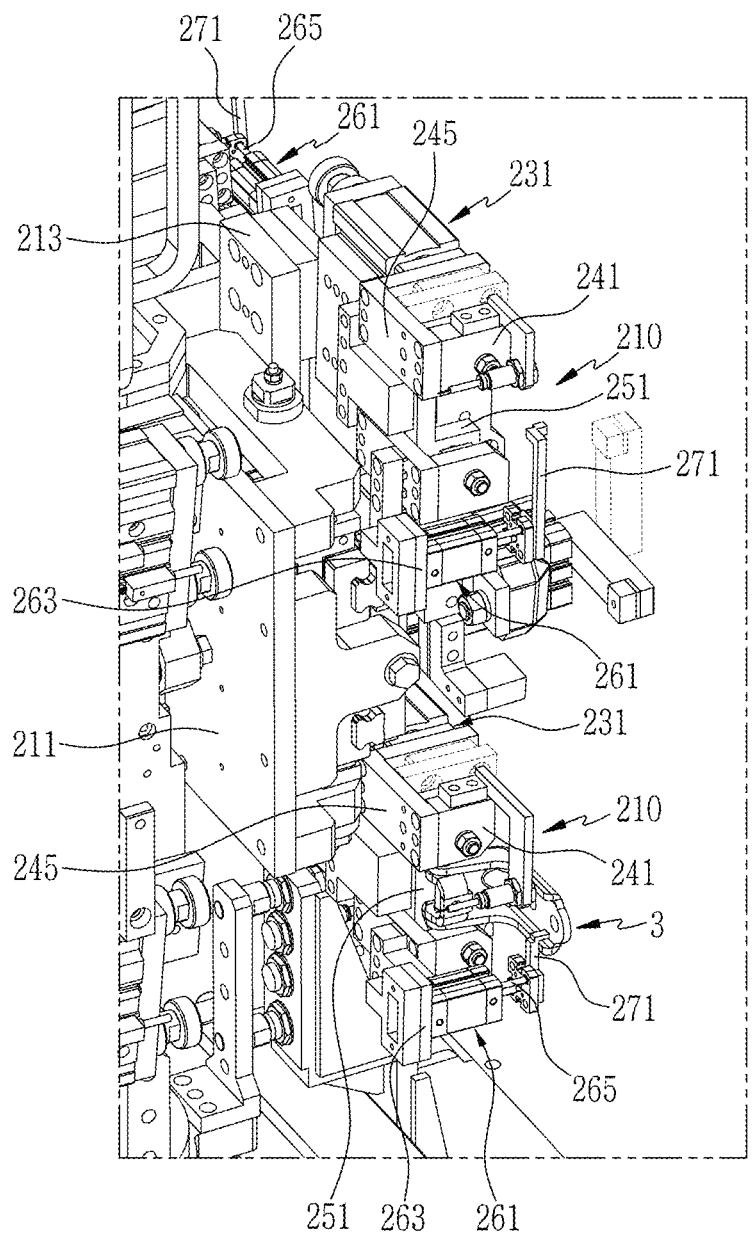
Figure 10:
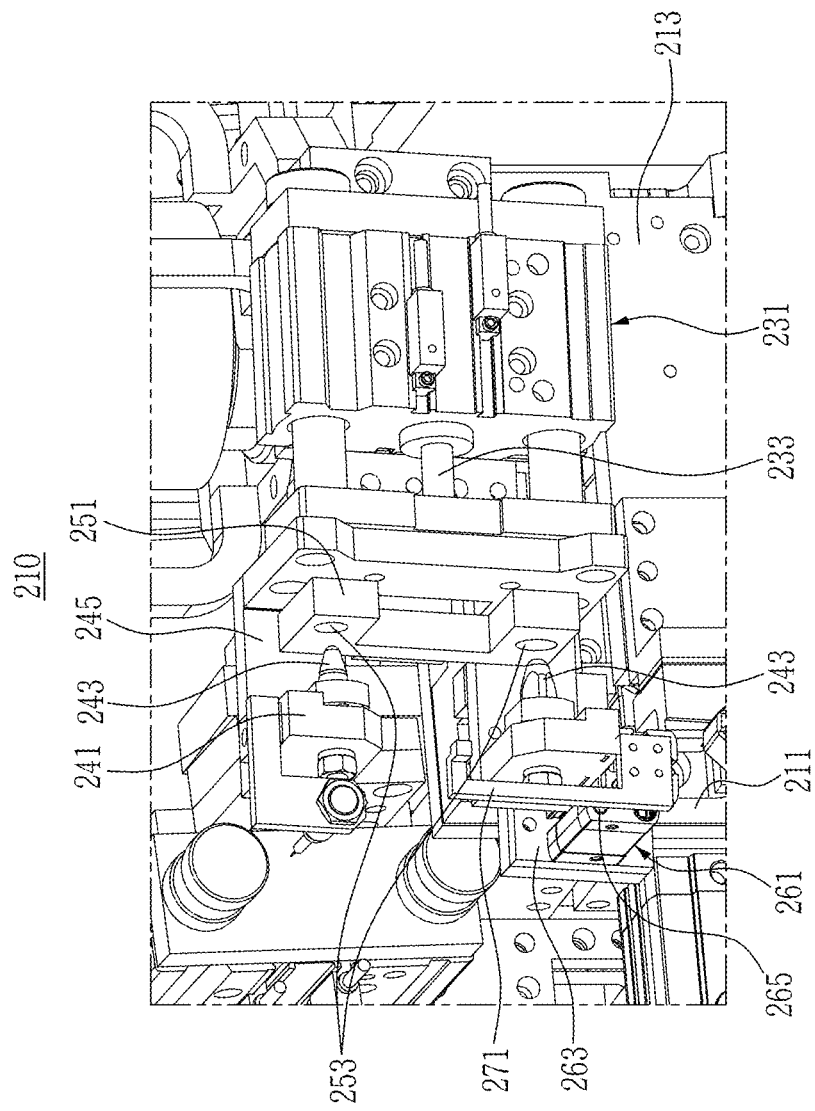
Figure 11:
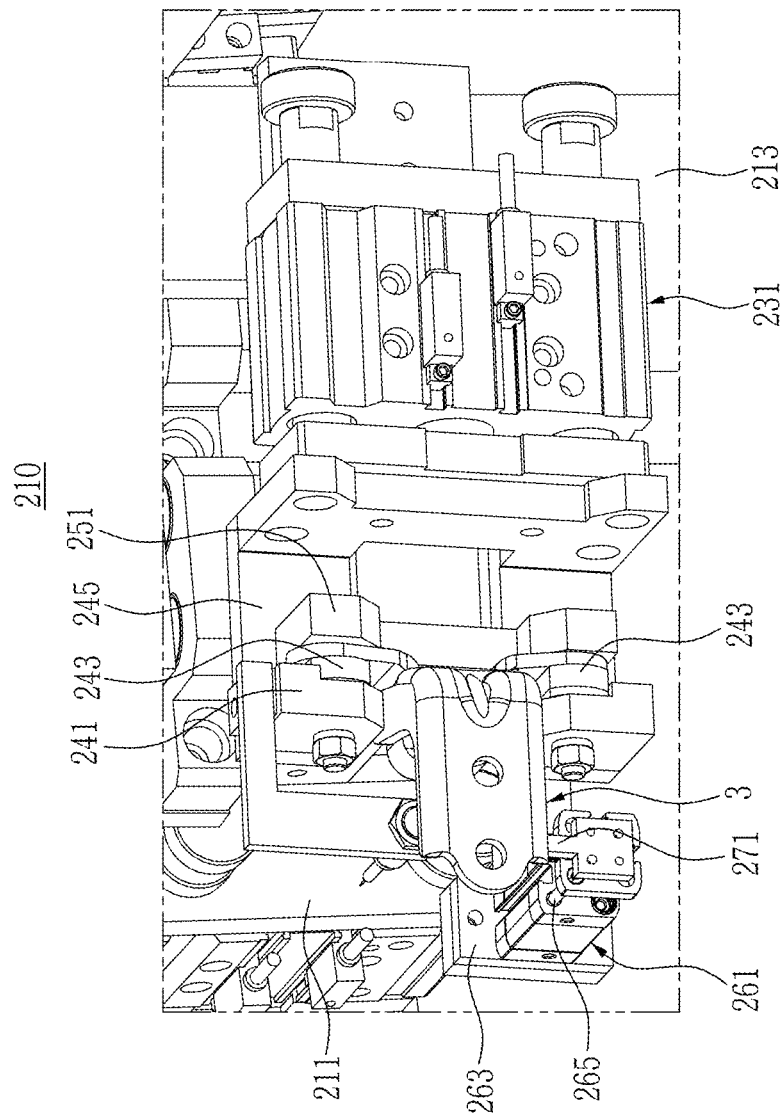

FIGS. 5-7 respectively illustrate a bezel fixing unit applied to a system for mounting a door hinge of a vehicle according to an embodiment.

Referring to FIGS. 5-7, the bezel fixing unit 110 penetrates cavities of the driveshaft 53 and the hollow vertical rotation shaft 70 described above and is fixedly installed to the jig frame 30.

The bezel fixing unit 110 includes a post member 111, a base member 131, a bezel guide member 151, and a union joint 171, that are respectively of a cylindrical shape.

The post member 111 is fixedly installed to the jig frame 30 through the cavity of the hollow vertical rotation shaft 70 of the driveshaft 53. A bottom end portion of the post member 111 penetrates the cavity of the hollow vertical rotation shaft 70 of the driveshaft 53 and is fixed to the jig frame 30.

The base member 131 has an opening portion 133 having a predetermined open portion. The base member 131 is provided at a bottom end of the post member 111 and is fixed to the jig frame 30.

The bezel guide member 151 has a plurality of penetration holes 153 and 155 through which the electric cable 101 and the air-supply tube 103 are inserted, respectively, through the interior of the post member 111. The bezel guide member 151 is connected to a top end of the post member 111.

The penetration holes 153 and 155 include a first penetration hole 153 and a second penetration hole 155. The electric cable 101 is inserted through the first penetration hole 153 through the opening portion 133 of the base member 131 and the interior of the post member 111. The air-supply tube 103 inserted through the second penetration hole 155 through the opening portion 133 of the base member 131 and the interior of the post member 111.

The first penetration hole 153 is formed to penetrate the bezel guide member 151 in the up and down directions. Separately from the first penetration hole 153, the second penetration hole 155 is formed along the up and down direction of the bezel guide member 151 to penetrate exterior circumference surfaces of the bezel guide member 151.

The union joint 171 is a joint connecting the post member 111 and the bezel guide member 151 and may be provided as a union nut of a cylindrical shape. The union joint 171 forms a connection hole 173 connected to the second penetration hole 155 of the bezel guide member 151.

Referring to FIG. 2, in an embodiment, the clamping unit 210 is configured to clamp the door hinge 3 and is installed on a base plate 211 fixed to each side of the vertical rotation shaft 70.

Such a clamping unit 210 is installed on each side of the vertical rotation shaft 70 to clamp different door hinges 3 for different vehicle types. In other words, since the vertical rotation shaft 70 is provided as the polyhedron 71 having four surfaces as described above, the clamping unit 210 installed on each side may clamp the door hinge 3 corresponding to four vehicle types.

FIGS. 8-11 respectively illustrate a clamping unit applied to a system for mounting a door hinge of a vehicle according to an embodiment.

Referring to FIGS. 8-11, the clamping unit 210 according to an embodiment is installed via a mounting plate 213 on the base plate 211 as mentioned above and is disposed on the mounting plate 213 in the up and down directions respectively.

In this example, the clamping unit 210 is configured on the upper and lower sides of the mounting plate 213, respectively. In this case, an upper clamping unit 210 clamps an upper hinge of the door hinges 3, and a lower clamping unit 210 clamps a lower hinge of the door hinges 3.

Each clamping unit 210 includes a first driving cylinder 231, a movable block 241, a fixed block 251, a second driving cylinder 261, and a stopping block 271.

The first driving cylinder 231 is a pneumatic cylinder that is fixedly installed to the mounting plate 213. The movable block 241 has a pair of tooling pins 243, which are fitted into a tooling hole 6b of the door hinge 3 and is connected to an operation rod 233 of the first driving cylinder 231 via a movable bracket 245. The movable block 241 may move in the vehicle length direction of the vehicle body through the movable bracket 245 by forward and backward operations of the first driving cylinder 231.

The fixed block 251 has a clamp hole 253 into which the tooling pin 243 is fitted after penetrating the tooling hole 6b of the door hinge 3 and is fixedly installed to the mounting plate 213.

The fixed block 251 does not interfere with the movable bracket 245 and the movable block 241 moving in the forward and rearward directions by the first driving cylinder 231. The fixed lock 251 is fixedly installed to the mounting plate 213 between the first driving cylinder 231 and the movable block 241.

In this example, the movable block 241 is moved backward by the backward operation of the first driving cylinder 231 and may clamp the door hinge 3 through the fixed block 251.

In an embodiment, with the movable block 241 having moved forward with the forward movement of the first driving cylinder 231, the tooling pin 243 may be inserted into the tooling hole 6b of the door hinge 3 and may set the door hinge 3 in the movable block 241.

In an embodiment, while the door hinge 3 is set to the movable block 241, the movable block 241 may be moved backward by the backward operation of the first driving cylinder 231, and the tooling pin 243 may be inserted into the clamp hole 253 of the fixed block 251, thereby to clamp the door hinge 3 through the movable block 241 and the fixed block 251.

The second driving cylinder 261 is a pneumatic cylinder and is fixedly installed to the mounting plate 213 via a fixing bracket 263. The stopping block 271 supports the door hinge 3 clamped between the movable block 241 and the fixed block 251. In other words, the stopping block 271 is provided as a positioning block that prevents a movement of the door hinge 3 clamped between the movable block 241 and the fixed block 251.

The stopping block 271 is connected to an operation rod 265 of the second driving cylinder 261. The stopping block 271 may be reciprocated in the vehicle width direction by forward and backward operation of the second driving cylinder 261.

Figure 12:
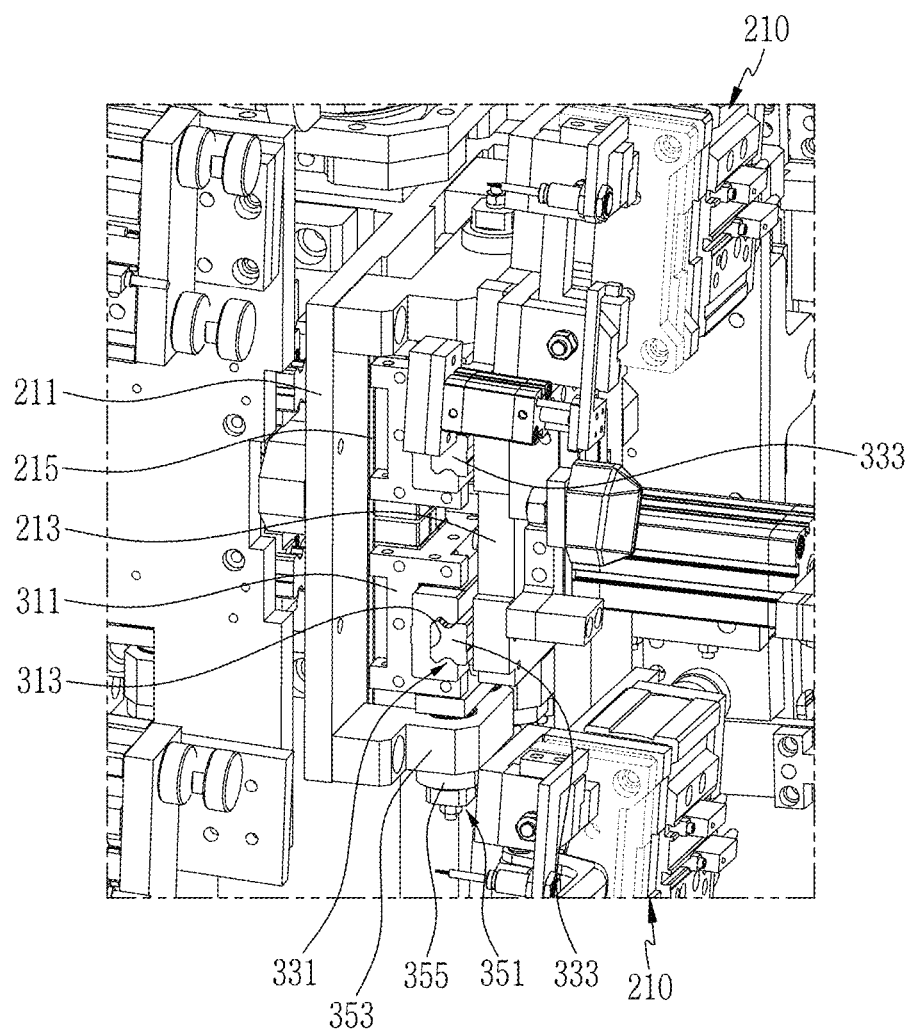
FIG. 12 illustrates a floating structure applied to a system for mounting a door hinge of a vehicle according to an embodiment.

FIG. 12 illustrates a floating structure applied to a system for mounting a door hinge of a vehicle according to an embodiment.

Referring to FIG. 12, an embodiment further includes a floating structure for finely adjusting the position of the clamping unit 210 through the mounting plate 213 according to the position of the vehicle body 1 and an assembly deviation.

In an embodiment, the floating structure includes a floating body 311, a first floating member 331, and a second floating member 351.

The floating body 311 corresponds to the mounting plate 213, and is coupled to the base plate 211, slidably in the up and down directions. The floating body 311 is slidably coupled to a guide rail 215 provided in the up and down directions on the base plate 211.

The first floating member 331 supports the forward and rearward movement of the mounting plate 213 along the vehicle length direction of the vehicle body 1. The first floating member 331 is connected to the mounting plate 213 and slidably coupled to the floating body 311 along the vehicle length direction of the vehicle body 1.

This first floating member 331 includes a plurality of rail blocks 333 that are fixedly mounted to the mounting plate 213. Each rail block 333 of the plurality of rail blocks 333 is coupled to a guide rail 313 slidably along the vehicle length direction of the vehicle body 1, the guide rail 313 being provided to the floating body 311 along the vehicle length direction of the vehicle body 1.

The second floating member 351 supports an up and down movement of the floating body 311 connected to the mounting plate 213 via first floating member 331. The second floating member 351 is installed at the base plate 211, correspondingly to a bottom end of the floating body 311.

The second floating member 351 includes a mounting block 353 and a plurality of cushion cylinders 355. The mounting block 353 is fixedly installed to the base plate 211 along the vehicle length direction of the vehicle body 1. The plurality of cushion cylinders 355 are installed to the mounting block 353 with a predetermined spacing.

A cushion cylinder 355 is a cushion unit elastically supporting the bottom end of the floating body 311 and is structured such that a portion supporting the bottom end of the floating body 311 may move in the up and down direction through a spring (not shown in the drawings) inside the cylinder.

Figure 13:
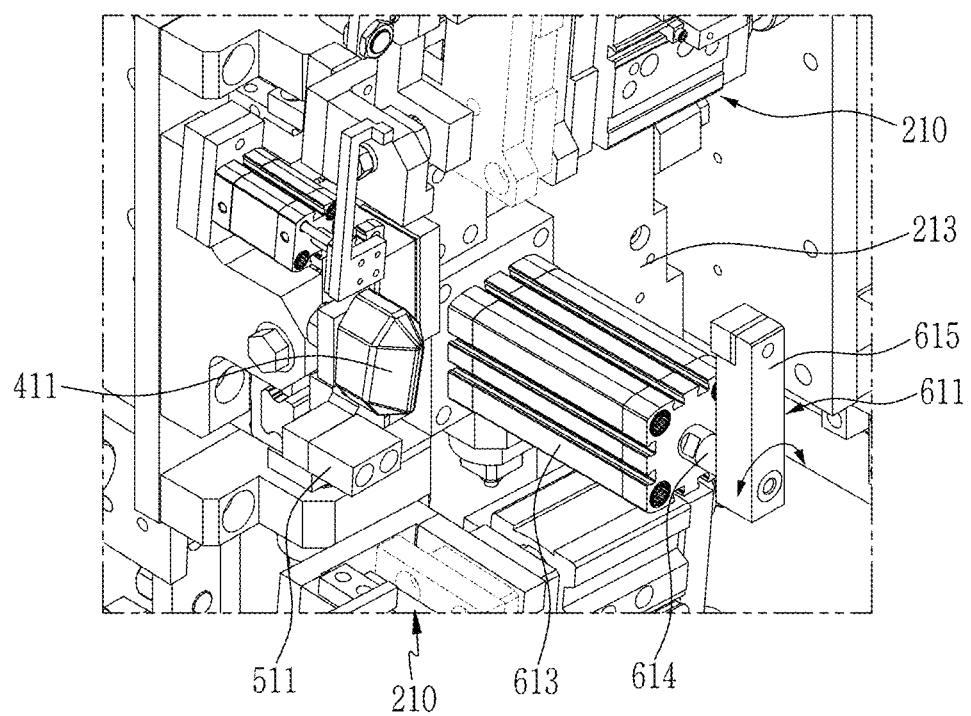
FIG. 13 illustrates a part of a system for mounting a door hinge of a vehicle according to an embodiment.

FIG. 13 illustrates a part of a system for mounting a door hinge of a vehicle according to an embodiment.

Referring to FIG. 13, an embodiment further includes a centering block 411, a supporting block 511, and a vehicle body clamper 611, for supporting and clamping the vehicle body 1 while holding a reference position of the mounting plate 213 relative to the vehicle body 1.

In an embodiment, the centering block 411 holds the reference point of the mounting plate 213 relative to the vehicle body 1 and is fixedly installed to the mounting plate 213. The centering block 411 may be fitted into the center hole 9 of the vehicle body 1.

The centering block 411 is provided in a shape in which a cross-section gradually increases as the centering block 411 moves away from the vehicle body 1. In other words, the centering block 411 forms a taper at an end.

In an embodiment, if an assembly deviation of the vehicle body 1 or a positional deviation occurs, the centering block 411 fits into the center hole 9 of the vehicle body 1, and the position of the clamping unit 210 provided at the mounting plate 213 may be finely adjusted through the first and second floating members 331 and 351 (refer to FIG. 12).

In an embodiment, the supporting block 511 supports an outer panel of the vehicle body 1 and is fixedly installed to mounting plate 213. For example, the supporting block 511 is provided in a shape of a rectangular block of rubber material.

In addition, in an embodiment, the vehicle body clamper 611 is configured to clamp vehicle body 1 and is rotatably installed on the mounting plate 213. The vehicle body clamper 611 includes a rotation cylinder 613 and a clamping block 615.

The rotation cylinder 613 is fixedly installed to the mounting plate 213 and is disposed in the vehicle width direction on the mounting plate 213. The rotation cylinder 613 has a rotation rod 614 that rotates by a pneumatic pressure.

The clamping block 615 clamps the interior side of the vehicle body 1 and is connected to the rotation rod 614 of the rotation cylinder 613. The clamping block 615 may clamp the interior side of the vehicle body 1 by entering the interior side of the vehicle body 1 and rotating by a rotational operation of the rotation rod 614 by the rotation cylinder 613.

The rotation rod 614 may be reciprocated in the vehicle width direction through a lead screw coupling structure known in the art which rotates by a pneumatic pressure and converts a rotational motion into a linear reciprocal motion.

Hereinafter, an operation of a system for mounting a door hinge of a vehicle according to an embodiment 100 is described in detail with reference to the drawings.

First, in an embodiment, the vehicle body 1 is transferred to a predetermined position along the vehicle transfer line. In this process, the jig frame 30 is moved backward in the vehicle width direction away from the vehicle body 1 along the guide rail 33 on the base frame 10 by the backward operation of the main driving cylinder 35 on both sides of the vehicle transfer line.

In an embodiment, the electric cable 101 and the air-supply tube 103 are located inside the cavity of the vertical rotation shaft 70 through the bezel fixing unit 110.

In this example, the electric cable 101 is held in the first penetration hole 153 of the bezel guide member 151 through the opening portion 133 of the base member 131 and the interior of the post member 111. The air-supply tube 103 is held in the second penetration hole 155 of the bezel guide member 151 through the opening portion 133 of the base member 131 and the interior of the post member 111.

Furthermore, the vertical rotation shaft 70 is connected to the rotation center axis S of the rotation index 50 coaxially in the up and down direction, through the driveshaft 53 connected to the servomotor 51.

In this case, the vertical rotation shaft 70 is rotated at a predetermined angle through the rotation index 50, correspondingly to the type of vehicle of the vehicle body 1. In an embodiment, the torque of the driveshaft 53 driven by the servomotor 51 is transmitted to the rotation index 50, and the vertical rotation shaft 70 connected to the rotation index 50 may be rotated by a predetermined angle (90 degree unit).

In this example, one side of the vertical rotation shaft 70 faces the assembly side of the vehicle body 1, and the clamping unit 210 for clamping the door hinge 3 according to the vehicle type of the vehicle body 1 faces the assembly side of the vehicle body 1, at both the upper and lower sides of the vertical rotation shaft 70.

Furthermore, in an embodiment, the movable block 241 of the clamping unit 210 is moved forward in a direction away from the fixed block 251 by the forward operation of the first driving cylinder 231. In addition, the stopping block 271 of the clamping unit 210 is moved backward by the backward operation of the second driving cylinder 261.

In this state, in an embodiment, the door hinge 3 is set to the movable block 241, in which the door hinge 3 is set to the movable block 241 while inserting the tooling hole 6b of the door hinge 3 into the tooling pin 243 of the movable block 241.

Then, in an embodiment, by the backward operation of the first driving cylinder 231, the movable block 241 is moved backward in a direction approaching the fixed block 251.

Thus, in an embodiment, the tooling pin 243 is inserted into the clamp hole 253 of the fixed block 251, and the door hinge 3 is clamped through the movable block 241 and the fixed block 251.

Subsequently, in an embodiment, the stopping block 271 is moved forward by the forward operation of the second driving cylinder 261. Then, the stopping block 271 supports the door hinge 3 clamped between the movable block 241 and the fixed block 251 and prevents a movement of the door hinge 3.

Subsequently, in an embodiment, by the forward operation of the main driving cylinder 35, the jig frame 30 is moved forward along the guide rail 33 in the vehicle width direction approaching the vehicle body 1.

Then, in an embodiment, the support block 511 supports the front and rear pillars 2 of the vehicle body 1 and, simultaneously, the centering block 411 is coupled to the center hole 9 of the vehicle body 1, thereby setting the reference position of the clamping unit 210 with respect to the vehicle body 1. At this time, the clamping block 615 is located inside the vehicle body 1 without interfering with the front and rear pillars 2 of the vehicle body 1.

In the case of an assembly deviation of the vehicle body 1 or a positional deviation, in an embodiment, when the centering block 411 fits into the center hole 9 of the vehicle body 1, the position of the mounting plate 213 supporting the clamping unit 210 may be finely adjusted to a predetermined position through the first and second floating members 331 and 351.

In this case, in an embodiment, the mounting plate 213 may slide in the floating body 311 along the forward and rearward direction through the rail block 333 of the first floating member 331, and the position of the mounting plate 213 may be finely adjusted to a predetermined position.

In addition, in an embodiment, the floating body 311 supporting the mounting plate 213 may slide along the up and down direction by the cushion cylinder 355 of the second floating member 351, and the position of the mounting plate 213 may be finely adjusted to a predetermined position.

In the state as described above, in an embodiment, the clamping block 615 is rotated by the rotation operation of the rotation rod 614 of the rotation cylinder 613, and the interior side of the vehicle body 1 is clamped by the clamping block 615.

Thus, in an embodiment, the door hinge 3 clamped to the clamping unit 210 may be correctly positioned in the upper and lower door hinge mounting portions 4 at the front and rear pillars 2 of the vehicle body 1.

In an embodiment, the hinge bracket 5 of the door hinge 3 is brought into close contact with the upper and lower door hinge mounting portions 4, and the first fastening hole 5a of the hinge bracket 5 coincides with the bolt hole 8 of the upper and lower door hinge mounting portions 4.

Finally, in an embodiment, the door hinge 3 is bolted to the upper and lower door hinge mounting portions 4 by a bolting device, e.g., a bolt runner (not shown in the drawing).

According to an embodiment as described above, a clamping unit 210 for clamping different door hinges 3 for different types of vehicles may be configured on each side of the vertical rotation shaft 70, and the vertical rotation shaft 70 may be rotated through the rotation index 50.

Therefore, a system for mounting a door hinge of a vehicle according to embodiments may be used to actively cope with mixed production of multiple types of vehicles and may provide reduction of an equipment investment cost since it is not necessary to add equipment according to every vehicle type.

In addition, an embodiment may simplify the configuration of the clamping unit 210 that clamps the door hinge 3 and may reduce the weight and volume of the entire apparatus by coaxially connecting the vertical rotation shaft 70 and the rotation index 50 along the up and down directions.

Thus, in an embodiment, simultaneous mounting of the door hinge 3 to the upper and lower door hinge mounting portions 4 of the front and rear pillars 2 allows for reduced workforce and operating costs due to process reduction, thereby further improving the work efficiency and productivity.

Furthermore, in an embodiment, by reducing the number of parts of the entire apparatus, it is possible to minimize the failure factor of the equipment, thereby reducing the maintenance and repair work of the equipment, and further improving the utilization rate of the equipment.

Furthermore, in an embodiment, the electric cable 101 and the air-supply tube 103 are formed inside the vertical rotation shaft 70 through the bezel fixing unit 110, thereby further improving the worker's working degree of freedom.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A system for mounting a door hinge to upper and lower mounting portions of front and rear pillars of a vehicle body being transferred along a vehicle transfer line, the system comprising:
   a jig frame installed to reciprocate in a vehicle width direction through a driving unit on a base frame outside the vehicle transfer line;
   a rotation index installed on the jig frame and rotatable by a predetermined angle through a servomotor;
   a vertical rotation shaft formed as a polyhedron having a cavity and coaxially connected to a rotation center axis of the rotation index along an up and down vertical direction; and
   a pair of clamping units installed through a mounting plate to a base plate fixed to each side of the vertical rotation shaft, the pair of clamping units being disposed at upper and lower portions of the mounting plate and configured to clamp the door hinge,
   wherein each of the pair of clamping units includes
      a first driving cylinder fixedly installed to the mounting plate,
      a movable block having a pair of tooling pins fitted into a tooling hole provided at the door hinge, and being connected to an operation rod of the first driving cylinder through a movable bracket, and
      a fixed block having a clamp hole fitted with the tooling pin penetrating the tooling hole of the door hinge and being fixedly installed to the mounting plate.

2. The system of claim 1, wherein:
   the rotation index is coupled to a hollow driveshaft connected to the servomotor on the jig frame; and
   cavity centers of the driveshaft and the vertical rotation shaft are coaxially connected to each other along an up and down direction.

3. The system of claim 1, wherein the movable block moves backward by the backward operation of the first driving cylinder and clamps the door hinge through the fixed block.

4. The system of claim 1, wherein each of the pair of clamping units further comprises:
   a second driving cylinder fixedly installed to the mounting plate through a fixing bracket; and
   a stopping block connected to an operation rod of the second driving cylinder and configured to support the door hinge clamped between the movable block and the fixed block.

5. The system of claim 1, further comprising:
   a floating body slidably coupled to the base plate in an up and down direction;
   a first floating member connected to the mounting plate, coupled to the floating body slidably along the vehicle length direction of the vehicle body, and configured to support a forward and backward movement of the mounting plate; and
   a second floating member installed to the base plate correspondingly to a bottom end of the floating body and configured to support an up and down movement of the floating body.

6. The system of claim 5, wherein the first floating member comprises:
   at least one rail block fixedly coupled to the mounting plate and slidably coupled along the vehicle length direction of the vehicle body to a guide rail provided on the floating body.

7. The system of claim 5, wherein the second floating member comprises:
   a mounting block fixedly installed on the base plate along the vehicle length direction of the vehicle body; and
   a plurality of cushion cylinders installed to the mounting block with a predetermined spacing and configured to support the bottom end of the floating body.

8. A system for mounting a door hinge to upper and lower mounting portions of front and rear pillars of a vehicle body being transferred along a vehicle transfer line, the system comprising:
- a jig frame installed to reciprocate in a vehicle width direction through a driving unit on a base frame outside the vehicle transfer line;
- a rotation index rotatably installed on the jig frame by a predetermined angle through a servomotor, and coupled to a hollow driveshaft connected to the servomotor;
- a vertical rotation shaft formed as a polyhedron having a cavity and coaxially connected to the rotation index along an up and down vertical direction;
- a bezel fixing unit fixedly installed to the jig frame by penetrating the cavity of the driveshaft and the cavity of the vertical rotation shaft, and configured to interiorly hold an electric cable and an air-supply tube; and
- a pair of clamping units installed through a mounting plate to a base plate fixed to each side of the vertical rotation shaft, the pair of clamping units being disposed at upper and lower portions of the mounting plate and configured to clamp the door hinge.

9. The system of claim 8, wherein the bezel fixing unit comprises:
- a post member formed in a cylindrical shape and fixed to the jig frame through cavities of the driveshaft and the vertical rotation shaft;
- a bezel guide member having a plurality of penetration holes fitted with the electric cable and the air-supply tube through an interior of the post member, and being connected to the post member; and
- a union joint connecting the post member and the bezel guide member.

10. The system of claim 9, wherein the penetration holes comprise:
- a first penetration hole penetrating the bezel guide member in an up and down direction and fitted with the electric cable; and
- a second penetration hole being separate from the first penetration hole, formed along the up and down direction of the bezel guide, penetrating exterior circumference surfaces of the bezel guide member, and fitted with the air-supply tube.

11. The system of claim 9, wherein the bezel fixing unit further comprises:
- a base member formed in a cylindrical shape having an opening portion, disposed at a bottom end of the post member, and fixed to the jig frame.

12. The system of claim 8, wherein the vertical rotation shaft is formed as a polyhedron having four surfaces.

13. A system for mounting a door hinge to upper and lower mounting portions of front and rear pillars of a vehicle body being transferred along a vehicle transfer line, the system comprising:
- a jig frame installed to reciprocate in a vehicle width direction through a driving unit on a base frame outside the vehicle transfer line;
- a rotation index rotatably installed on the jig frame by a predetermined angle through a servomotor, and coupled to a hollow driveshaft connected to the servomotor;
- a vertical rotation shaft formed as a polyhedron having a cavity and coaxially connected to the rotation index along an up and down vertical direction;
- a bezel fixing unit fixedly installed to the jig frame by penetrating the cavity of the driveshaft and the cavity of the vertical rotation shaft, and configured to interiorly hold an electric cable and an air-supply tube;
- a pair of clamping units installed through a mounting plate to a base plate fixed to each side of the vertical rotation shaft, the pair of clamping units being disposed at upper and lower portions of the mounting plate and configured to clamp the door hinge;
- at least one centering block fixedly installed to the mounting plate, inserted into a center hole provided at the vehicle body, and holding a reference point of the mounting plate with respect to the vehicle body;
- at least one supporting block fixedly installed to the mounting plate, and configured to support an outer panel of the vehicle body; and
- a vehicle body clamper rotatably installed to the mounting plate to clamp the vehicle body.

14. The system of claim 13, wherein:
- the jig frame is slidably coupled to a guide rail installed on the base frame in the vehicle width direction; and
- the driving unit is installed to the base frame and comprises a main driving cylinder connected to the jig frame.

15. The system of claim 13, wherein:
- the centering block is formed in a shape of which a cross-section gradually increases as the centering block moves away from the vehicle body; and
- the supporting block is formed in a shape of a rectangular block of rubber material.

16. The system of claim 13, wherein the vehicle body clamper comprises:
- a rotation cylinder fixedly installed to the mounting plate; and
- a clamping block connected to a rotation rod of the rotation cylinder and configured to clamp an interior side of the vehicle body.

17. The system of claim 13, wherein the bezel fixing unit comprises:
- a post member formed in a cylindrical shape and fixed to the jig frame through cavities of the driveshaft and the vertical rotation shaft;
- a bezel guide member having a plurality of penetration holes fitted with the electric cable and the air-supply tube through an interior of the post member, and being connected to the post member; and
- a union joint connecting the post member and the bezel guide member.

18. The system of claim 13, wherein each of the clamping units comprises:
- a first driving cylinder fixedly installed to the mounting plate;
- a movable block having a pair of tooling pins fitted into a tooling hole provided at the door hinge, and being connected to an operation rod of the first driving cylinder through a movable bracket; and
- a fixed block having a clamp hole fitted with the tooling pin penetrating the tooling hole of the door hinge and being fixedly installed to the mounting plate.

19. The system of claim 13, further comprising:
- a floating body coupled to the base plate slidably in an up and down direction;
- a first floating member connected to the mounting plate, coupled to the floating body slidably along the vehicle length direction of the vehicle body, and configured to support a forward and backward movement of the mounting plate; and a second floating member installed to the base plate correspondingly to a bottom end of the floating body and configured to support an up and down movement of the floating body.

\* \* \* \* \*